Oct. 24, 1950     L. C. HUCK     2,527,307
RIVET AND METHOD OF RIVETING
Filed June 23, 1947     2 Sheets-Sheet 1
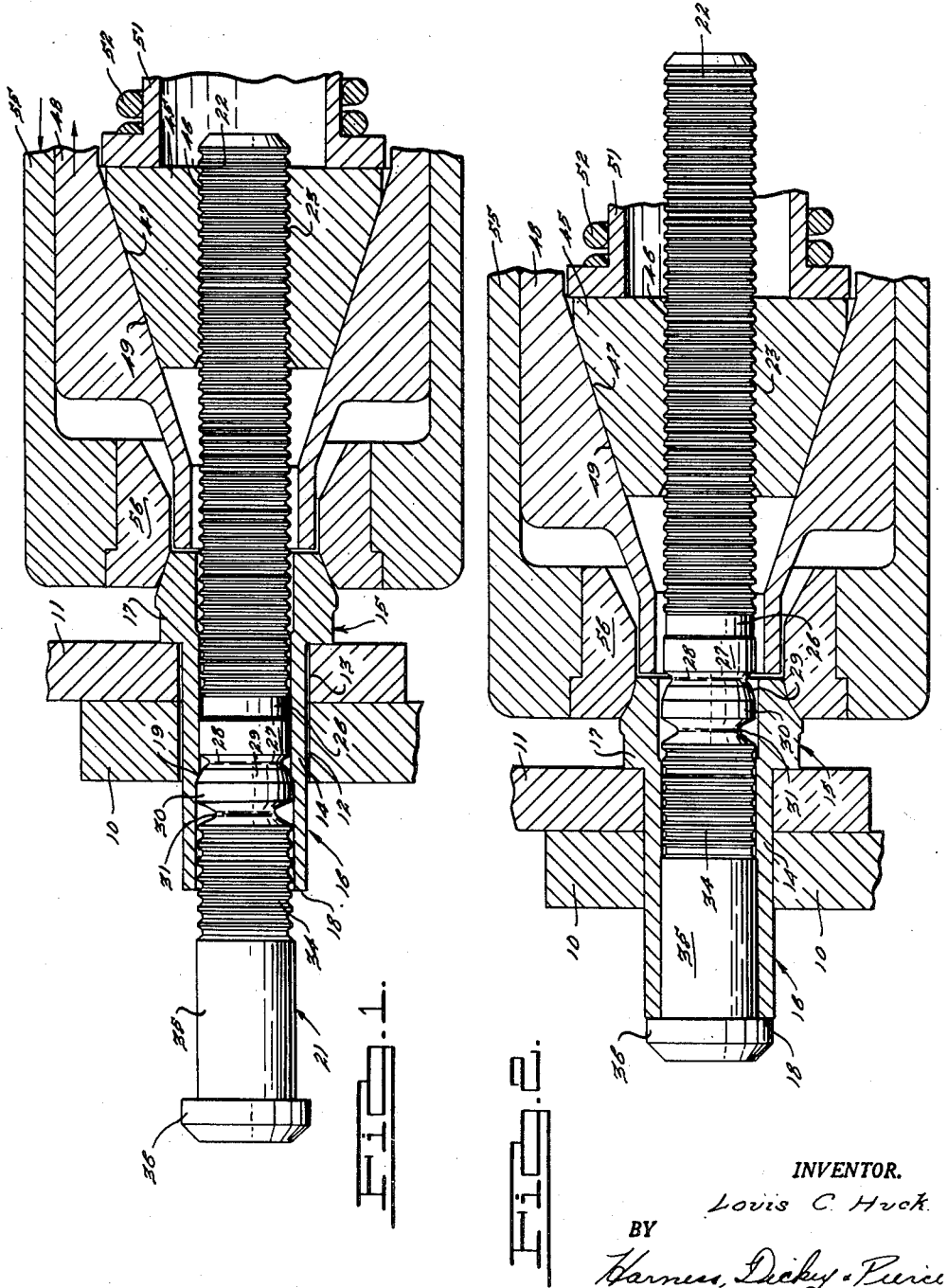
INVENTOR.
Louis C. Huck
BY
Harness, Dickey & Pierce
ATTORNEYS.

Oct. 24, 1950
L. C. HUCK
2,527,307
RIVET AND METHOD OF RIVETING
Filed June 23, 1947
2 Sheets-Sheet 2
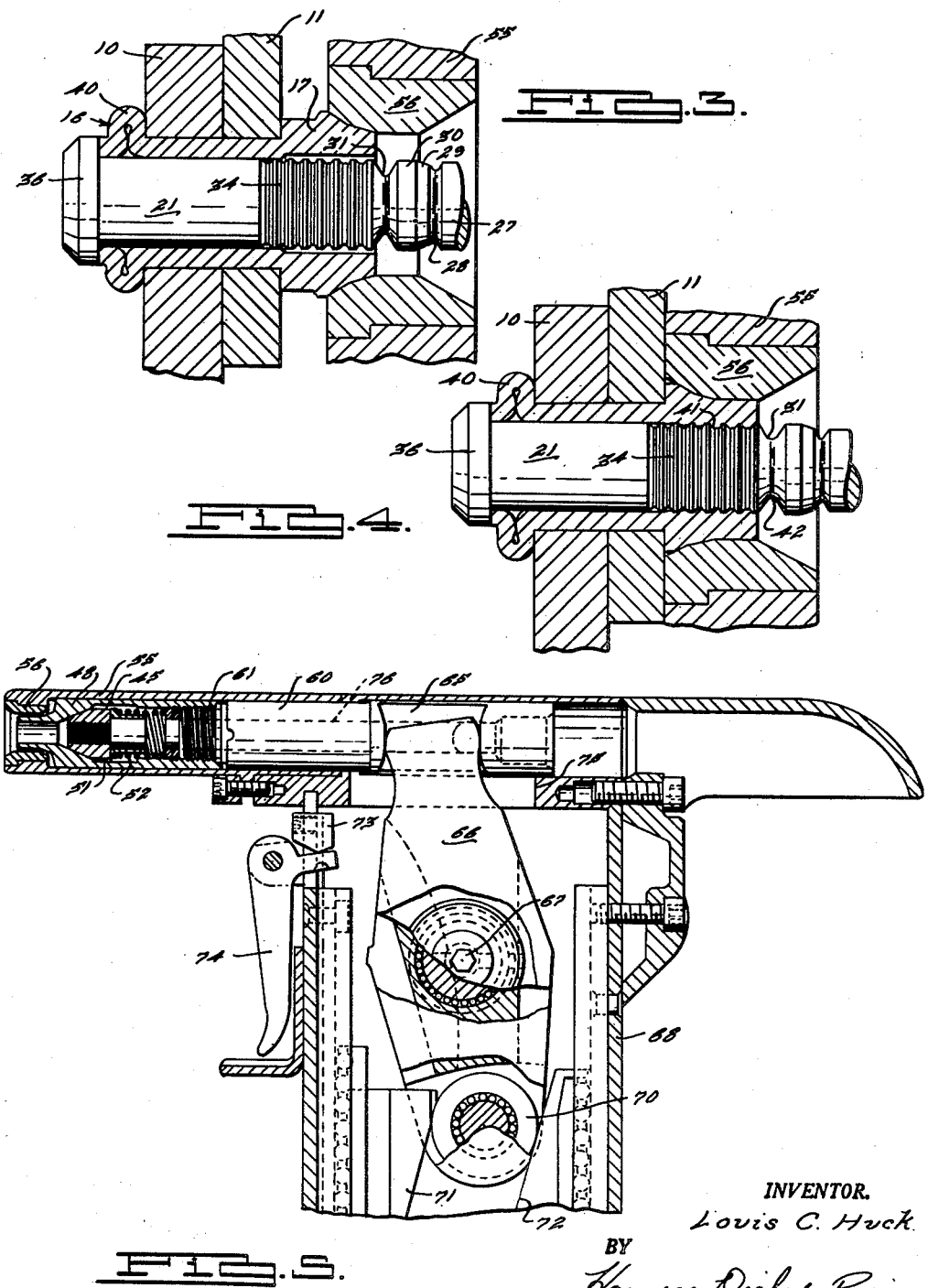
INVENTOR.
Louis C. Huck
BY
Harness, Dickey & Pierce
ATTORNEYS Patented Oct. 24, 1950

2,527,307

UNITED STATES PATENT OFFICE 2,527,307

RIVET AND METHOD OF RIVETING

Louis C. Huck, Detroit, Mich., assignor to Huck Manufacturing Company, a corporation of Michigan Application June 23, 1947, Serial No. 756,540

2 Claims. (Cl. 218—29)

The invention relates to fastening devices and it has particular relation to a rivet or the like, and method of riveting.

In certain respects the invention is related to the rivet disclosed in my co-pending application for patent, Serial No. 711,883, filed November 23, 1946, now abandoned, and in such respects may be considered a continuation in part thereof.

The type of rivet disclosed in that application for patent comprises a tubular element, having a body portion adapted to project through openings in a structure to be riveted, a manufactured head to engage the work side of the structure and a projecting portion to be formed into a head at the blind side of the structure. The rivet also includes a pin extending through the tubular element and having a head at the blind end of the tubular element which is adapted to expand the projecting tubular portion when the pin is pulled through the tubular element from the work side of the structure. During movement of the pin through the tubular member, that portion of the tubular body within the openings in the structure, is expanded in order to fill the openings and this expansion is effected before the blind head is formed on the tubular element. Thereafter, and during continued movement of the pin, the blind head is formed and movement of the pin is interrupted.

In a riveting operation such as mentioned, it is evident that substantial pin movement is required, due to the sequence of operations. Prior to the practice of the present invention, it has been the practice to use a rivet setting equipment, including means for gripping and pulling the pin in the rivet, and due to the amount of movement required, the stroke of the pin gripping means necessarily has been at least as great as the pin movement. Ordinarily, fluid operated means have been employed for setting the rivet and this includes a cylinder and piston, and therefore, the stroke of the piston and consequently the length of the cylinder, had to be sufficient to effect the desired pin movement. Not only did this necessitate a long stroke in the mechanism, but it required a bulkier and heavier mechanism and this made it more laborous and fatiguing to operate the mechanism. Wherever, as in a case of this character, it is necessary for the operator to hold and manipulate the riveting mechanism by hand, it is important that the mechanism be as light as possible for obvious reasons and yet it must be very strong and sturdy, since substantially high fluid pressure is used. The longer stroke required in the riveting operation therefore, requires the use of a heavier and bulkier gun, which is undesirable for these reasons. It is evident finally, that a mechanism involving a long stroke, costs substantially more to build and service.

One object of the present invention is to provide a rivet and method of riveting wherein the pin will be pulled a substantial amount in setting the rivet, while still permitting use of a smaller, lighter and compact riveting mechanism.

Another object of the invention is to provide a rivet and method of riveting wherein the pin will be moved substantially in the riveting operation, which permits using a riveting mechanism having a stroke substantially less than the distance the pin will be moved.

Another object of the invention is to provide a rivet and method of riveting wherein the mechanism and rivet are so designed that the mechanism may be operated by gripping the pin successively at different locations so that the pin may be moved in the riveting operation by means of a plurality of reciprocations of the pin-gripping means.

Another object of the invention is to provide a rivet and method of riveting of this nature, wherein the rivet includes pull grooves and is so designed that the mechanism will always be able to grip a portion of the pin having pull grooves therein, thereby avoiding any possibility that the mechanism will grip any portion of the pin not having pull grooves.

Another object of the invention is to provide an improved type of rivet having pull grooves so arranged as to enable functioning of the rivet mechanism in the manner indicated.

Other objects of the invention will become apparent from the following specification, the drawings relating thereto and from the claims hereinafter set forth.

For a better understanding of the invention, reference may be had to the accompanying drawings, forming a part of the specification, wherein:

Figure 1 is a cross-sectional view showing a rivet and a portion of riveting mechanism as constructed in accordance with one form of the invention.

Fig. 2 is a view similar to Fig. 1, illustrating the parts in an intermediate stage of the riveting operation.

Fig. 3 shows the same rivet after the blind head is formed and before the swage lock is effected.

Fig. 4 is a view similar to Fig. 3, but showing the parts as seen after the swage lock is effected.

Fig. 5 is a fragmentary view of a riveting mechanism which may be used in setting the rivet.

Referring to Fig. 1, a pair of plates to be riveted are indicated at 10 and 11 and these have aligned openings 12 and 13 respectively. The rivet includes a metal tubular element 15, having a body portion 16 and a preformed or manufactured head 17 at one end of the latter. This element is adapted to project through the openings 12 and 13 with the head 17 engaging the plate 11 and the opposite end of the tubular body projects from plate 10 so that a head may be formed against the plate 10 when the rivet is set. Attention is directed to the fact that the tubular body 16, includes a portion 14 adapted substantially to become disposed within the width of the plates 10 and 11, and that this portion of the body has a somewhat smaller internal diameter. That portion of the tubular body adapted to be formed into a head against plate 10 is indicated at 18 and the internal diameter of this portion is somewhat larger. At the junction of the two portions 14 and 18, a frusto-conical shoulder 19 is provided.

The rivet also includes a metal pin generally indicated at 21 and this pin has a long end portion provided with pull grooves 22, so that the pin may be gripped by jaws in the riveting mechanism and pulled relative to the tubular element. With the pin and tubular member initially assembled, these pull grooves extend from the end of the pin to a point substantially past the head 17 on the tubular element and about half-way through such tubular element. As indicated at 23, the pull grooves have angled sides so that the jaws can be moved over the pull grooves to the desired gripping location. Further reference to this factor will be made presently in connection with the riveting mechanism.

Next to the inner end of the section having the pull grooves 22, the pin has a cylindrical portion 26 corresponding in diameter substantially to the pitch diameter of the pull grooves, and beyond this portion, the pin has a cylindrical land 27, which is slightly larger in diameter than the outside diameter of the ribs between the pull grooves. The outer diameter of the land 27 is so related to the inner diameter of the tubular portion 14 that a slight press fit is obtained between the land and the tubular portion 14, so as to hold the parts assembled prior to pulling of the pin when the rivet is set. Beyond the land 27, a groove 28 is provided in the pin and next to the groove, a frusto-conical shoulder 29 is formed which in turn at its larger end joins a cylindrical land 30 corresponding substantially in diameter to the inner diameter of the tubular portion 18. The groove 28 is purposely formed in rolling the pin blank during manufacture, so as to help displace metal in order to form the lands 27 and 30. Next to the land 30, the pin has a deep groove or breakneck 31 defining the point at which the pin will break under tension and the forming of this groove displaces metal which helps also to form land 30.

Next to the groove 31, the pin has a series of locking grooves 34, adapted to receive metal swaged from the head 17 at the end of the riveting operation so as to lock the head 17 to the pin and the ribs or lands between the grooves are slightly smaller in outside diameter than the land 30. Beyond the grooves 34, the pin has a smooth cylindrical portion 35, corresponding in diameter to that of the land 30 and the outer end of this portion joins a head 36, corresponding substantially in diameter to the outer diameter of the tubular body 16.

As the parts are initially assembled, the frusto-conical shoulder 29 on the pin is in close proximity to the shoulder 19 in the tubular body and as stated before, a slight press fit is provided between the pin and tubular body so that the parts are held in assembled relation. In setting the rivet, the pin is pulled through the tubular element while holding the latter against movement and the first operation that occurs is expansion of the tubular portion 14 by the shoulder 29 on the pin, so as to fill the openings 12 and 13. After this hole-filling operation, the head 36 on the pin will engage the end of the projecting tubular portion 18 and then upon further movement of the pin, the tubular portion 18 will be expanded outwardly to form a bulbed head as indicated at 40 in Figure 3. When this head is formed, the locking grooves 34 become disposed within the head 17 on the tubular element so as to place them in a position to receive metal swaged from the latter head. Thereafter the head 17 is swaged or contracted radially into the locking grooves 34 as indicated at 41 in Fig. 4, so as to lock the two parts of the rivet at the working side of the structure while the pin is still under tension. After this occurs, increased tension on the pin will break it at the breakneck 31, so that the pin is broken off along a line indicated at 42.

The rivet is set by means of mechanism which, as shown by Figs. 1 and 2, includes a plurality of jaws 45, having their inner surfaces provided with grooves 46, adapted to engage the pull grooves 22, and it will be understood that these jaws are disposed in circumferentially spaced relation so as to permit their expansion or contraction as required. The outer surfaces of the jaws as indicated at 47, are axially tapered and are engaged by a jaw moving member 48, having an inner surface 49 tapered to fit the outer surface of the jaws. A jaw follower 51 encircled by a coil spring 52, urges the jaws normally against the tapered surface 49, while allowing when required, a movement of the jaws to the right and expansion thereof, so as to free them from the pin. The mechanism is of such character, as will presently be evident, that the pulling forces applied to the member 48, have their reaction forces imparted against the head 17 of the tubular rivet by means of a barrel 55 and an anvil 56.

With the parts as seen in Fig. 1, the jaws 45 are in engagement with pull grooves towards the outer end of the pin and this engagement is brought about merely by movement of the end of the riveting mechanism over the pin until the anvil 56 approximately engages the head 17. During this movement of the mechanism, the jaws move out and in along the surface 49 as the teeth of the jaws ride over the pull grooves and it should be apparent that the spring 52 will cause the jaws to engage the pull grooves as soon as the teeth on the jaws are in a position to enter the pull grooves.

Heretofore the stroke of the riveting mechanism has been long enough so that the entire riveting operation could be effected through a continued movement of the member 48 and jaws 45, without changing the position of the jaws on the pin. According to the present invention, however, it has been determined that by providing a sufficiently long pin portion with pull grooves and relating these pull grooves to the length of pin movement required and to the tubular element, that repeated gripping of the pin at different locations can be satisfactorily accomplished through repeated reciprocations of the member 48. This requires that the pull grooves be sufficiently extensive and properly located so that the jaws will never be engageable with any part of the pin, excepting a part having pull grooves. In other words, up to the time that the riveting is actually completed, it should not be possible to move the mechanism over the pin to a point where the jaws engage a portion thereof not having pull grooves.

With the parts as shown in Fig. 1, the mechanism has been moved over the pin prior to beginning the riveting operation and the jaws are engaged with the outer end portion of the pin. Upon movement of the member 48 to the right, the pin is pulled and as previously stated, the hole in the plates is filled through expansion of the tubular portion 14. Upon sufficient movement of the member 48, the head 36 on the pin will engage the end of the tubular element as seen in Fig. 2. For the purposes of illustrating the use of the present invention, Fig. 2 shows the jaws 45 as now engaged with a second portion of the pin and this is accomplished by stopping the operation of the mechanism so that the member 48, instead of being moved in a pin-pulling direction, is caused to reverse and return to its initial position. The spring 52 then will cause the jaws 45 to return also and the jaws will move in and out as they pass over the pull grooves until finally the jaws will come in contact with the member 48 in its new position as shown by Fig. 2. The mechanism now may be operated to again cause the member 48 to move to the right and the riveting operation may be completed in the next stroke of the mechanism. It would be possible to use more than two strokes in completing the movement of the pin, with each stroke effecting one-half of the pin movement and this may be varied as the operator may desire. In any event, the invention permits using a short stroke mechanism that would complete only a fraction of the riveting operation and thus requires repeated reciprocations of the mechanism before the riveting is completed. This is a simple matter for the operator because it requires merely pulling and releasing a control trigger on the mechanism until the riveting is complete, or in other words, until the pin breaks. This arrangement is advantageous in that it permits using a small, light, compact mechanism for a short stroke.

While the mechanism could readily be varied, one type is illustrated in Fig. 5 fragmentarily, and includes the jaws 45, the member 48 and the barrel 55, together with other parts as shown by Fig. 1. Within the barrel, a reciprocatory member 60 is mounted and this member is threaded as indicated at 61 into the inner end of the member 48. The spring 52 is located in front of the member 60 and urges the jaws 45 forwardly as previously explained. Towards its rear end, the member 60 has recesses 65 on its opposite sides and these are engaged by a fork 66 pivoted as indicated at 67, in a casing 68 to which the barrel 55 is secured. At its lower end, the fork 66 carries a roller 70 which is adapted to roll between inclined guides 71 and 72, that are vertically movable in the casing 68. It is evident that if the guides 71 and 72 are moved upwardly, that the fork 66 will be swung clockwise so as to move the jaw actuating member 48 in a pin pulling direction and that when the guides are moved downwardly, a reverse movement of the parts will occur.

The guides 71 and 72 are rigidly fastened to a rod extending into a cylinder and such rod within the cylinder, has a piston thereon. It follows that when fluid or pressure is introduced into one end or the other of the cylinder, the piston will move accordingly and the fork 66 will be swung in one direction or the other, as the case may be. Operation of the mechanism is effected by means of a suitable valve including a shiftable element 73 and a trigger 74 so that when the trigger is pulled, the mechanism will operate to pull the rivet pin and then when the trigger is released, the mechanism will reverse. From this it follows that in order to complete the riveting operation in a series of steps, it is only necessary to pull the trigger and release it and to repeat this action as many times as required.

In the mechanism as shown, at least two reciprocations of the jaw actuating member 48 would be required, although more than this number could be used, depending on how many times the operator might pull or release the trigger before the rivet is set. If he pulled the trigger and retained his finger thereon, the fork would reach the limit of its clockwise movement as may either be determined by the fork engaging a wall 75 or stop, or by the piston engaging the end wall of the cylinder and then the operator would release the trigger and after the parts reversed their positions, he would pull the trigger again. The length of the cylinder is such as to limit the movement of the piston to a certain fraction of the movement required in fully setting the rivet so that during one movement of the piston the full length of the cylinder, a portion of the riveting operation would be completed and then one or more further movements of the piston would complete the riveting operation. It should be understood that the jaw follower 51 and member 60 are tubular or centrally open, as indicated at 76, so that the broken pin may pass on through the mechanism. This same feature allows advancing of the pin through the jaws as required in practicing the present invention.

The invention thus allows using a smaller, lighter and less expensive mechanism for setting rivets such as disclosed, or rivets where substantial pin movement is required. It thus is much easier for the operator to set rivets repeatedly because it is less tiring, and this is important, particularly when it is considered that such mechanisms are manually manipulated. Any operator setting a great many rivets as is required usually, necessarily becomes fatigued on account of carrying the mechanism in his hands and if a lighter and smaller gun can be used, as in accordance with this invention, then the fatigue is minimized. Furthermore, it is less expensive to build and service the mechanism.

Although only one form of the invention has been illustrated and described, it will be apparent to those skilled in the art that various changes and modifications may be made without departing from the scope of the appended claims.

What is claimed is:

1. A rivet comprising a tubular element having a head on one end and a pin extending through the tubular element and projecting from the head on the latter, and a head on the pin adapted to engage and expand the opposite end of such tubular element when the projecting portion of the pin is pulled, said pin having annular pull grooves arranged along its projecting portion and also along that portion of the pin within the head on the tubular element with the parts as assembled prior to setting the rivet.

2. The method of setting a multipart fastener including a tubular element and a pin extending therethrough having means on one end forming a head and having annular pull grooves extending over the other end a substantial distance so that the pull grooves may be repeatedly gripped progressively over the extent thereof and pulled relative to the tubular element, wherein the method comprises setting the fastener by means of a mechanism having gripping means positioned axially over the pin and pull grooves to initially grip the grooves over a portion only of the length thereof, moving the gripping means to pull the pin a portion only of the required movement to set the rivet, successively reciprocating the gripping means and gripping the grooves progressively therealong so that the pin is moved a portion only of the required movement to set the fastener during each stroke of the mechanism, the extent of the pull grooves being such as will permit initial engagement by the gripping means over a portion only of the extent of the pull grooves with the remaining portion being of such an extent as to permit repeated and successive gripping of progressive portions therealong for the remaining reciprocating strokes of the gripping means required to set the fastener.

LOUIS C. HUCK.

REFERENCES CITED

The following references are of record in the file of this patent:

UNITED STATES PATENTS

| Number | Name | Date |
|---|---|---|
| 2,146,461 | Bettington | Feb. 7, 1939 |
| 2,385,886 | Shaft | Oct. 2, 1945 |
| 2,405,898 | Milone | Aug. 13, 1946 |
| 2,406,157 | Nelson | Aug. 20, 1946 |
| 2,406,949 | Huck | Sept. 3, 1946 |